Patented June 5, 1945

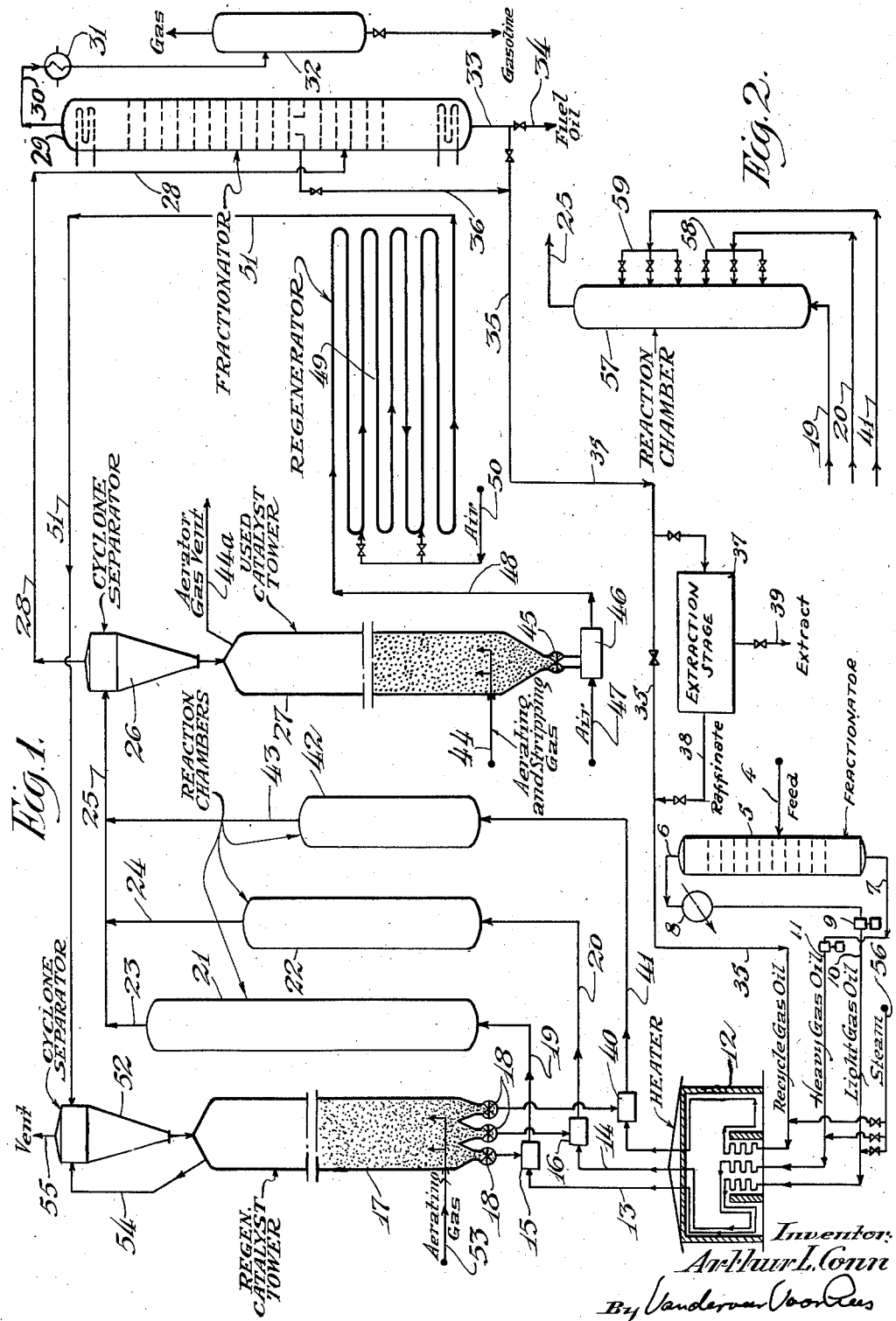

2,377,613

UNITED STATES PATENT OFFICE 2,377,613

POWDERED CATALYST CONVERSION

Arthur L. Conn, Chicago, Ill., assignor to Standard Oil Company, Chicago, Ill., a corporation of Indiana Application December 9, 1940, Serial No. 369,146

10 Claims. (Cl. 196—50)

This invention relates to the conversion of hydrocarbon oils and particularly to the conversion of gas oils with powdered catalysts in the vapor phase. The principal object of the invention is to effect simultaneously the conversion of two or more oils of different cracking characteristics and obtain optimum results from each of them, especially with respect to maximum yield and knock rating of gasoline. Still another object of the invention is to control the conversion of different oils with a powdered catalyst in such a way that a substantially uniform deposit of carbon is obtained on the catalyst employed with each oil. Other more detailed objects and advantages of the invention will be apparent from the following description thereof.

The invention is illustrated by a drawing which shows schematically in Figure 1 an apparatus for carrying out the process of vaporizing the gas oils and contacting them with powdered catalyst followed by separation of used catalysts from the vapors and regeneration of the used catalyst. Figure 2 shows an alternative arrangement of the reaction chambers.

Referring to the drawing the system may be charged with two different grades of gas oil, for example, a light gas oil and a heavy gas oil introduced by lines 10 and 11 respectively leading to separate coils in heater 12. In general, I prefer to separate the gas oil by distillation in a fractionating column 5, taking the light gas oil as a distillate fraction at 6 and the heavy gas oil as a residue at 7. Feed is supplied to the column at 4. Vapors are condensed by condenser 8 and the light fraction is forced by pump 9 into line 10. The oils are vaporized in the heater and the vapors are discharged by transfer lines 13 and 14 to catalyst mixers 15 and 16, the temperature of the vapors being sufficient to effect the desired conversion in the presence of the catalyst. Temperatures in the ranges of 850 to 1050° F. are desirable. The temperature of each stock may be separately controlled, however, to provide optimum results. For example, the temperature of the light gas oil vapors in line 13 may be substantially higher than the temperature of the heavy gas oil vapors in line 14. Thus, the light gas oil vapors may be heated in the range of 950 to 1000° F. while the heavy gas oil vapors are heated only to about 900 to 950° F. These conditions will insure low carbon formation with not too great a gas yield. However, the optimum conditions can only be determined by an economic analysis including all the factors involved. One factor of importance is the amount of carbon deposited on the catalyst as it affects catalyst regeneration. I prefer to obtain relatively uniform deposits of carbon on the catalyst and thereby get more uniform and more rapid regeneration of the catalyst under given conditions.

Powdered catalyst for the conversion is supplied by catalyst tower 17 which may suitably be a high vertical tower in which a sufficient head of powdered catalyst is maintained to supply catalyst against a moderate back pressure of oil vapors in mixers 15 and 16. Rotating valves 18 are mechanically operated to regulate the flow of catalyst from the tower to the mixers. Mixers 15 and 16 are constructed preferably in the form of a venturi through which the oil vapors pass at a high velocity for the purpose of rapidly dispersing the catalyst in the oil vapors. The dispersion of powdered catalyst and oil vapors is conducted by lines 19 and 20 to reaction chambers 21 and 22 where the velocity of the vapors is reduced and sufficient time is allowed for effecting the desired conversion reaction. Reaction chambers of different volumetric capacity may be employed to provide different times of contact between the oil vapors and the catalyst. The shape of the reaction chambers may also vary to permit a greater or lesser amount of sedimentation or retarded settling of catalyst in the reaction chambers. Reaction chambers having large cross-sectional areas give a lower vapor velocity for a given rate of charge and thereby permit a greater amount of settling of the catalyst to occur, thereby keeping the catalyst in the reaction chamber for a longer period of time before it is swept out at the top. Other means of varying vapor velocity may be employed such as baffles within the reaction chambers. The reaction temperatures maintained in chambers 21 and 22 are substantially those of transfer lines 13 and 14 respectively, mentioned hereinabove, averaging somewhat lower, however, because as the reaction proceeds the temperature in the reaction chambers falls, due to absorption of heat by the endothermic cracking reaction.

From chambers 21 and 22 the catalyst and oil vapors are conducted by lines 23 and 24 to line 25 leading to cyclone separator 26 wherein most of the powdered catalyst is separated from the hydrocarbon vapors and passed by gravity to the used catalyst tower 27. Vapors substantially free of catalyst are conducted by line 28 to fractionator 29 wherein the gasoline product is separated by fractionation from heavier unconverted gas oil and heavy reaction products. The gasoline and lighter products are conducted by vapor line 30 to condenser 31 and receiver 32 from which gasoline is withdrawn. The heavier reaction products and the unchanged gas oil are withdrawn by line 33 leading from the bottom of fractionator 29. They may be discarded from the system by line 34 and employed for fuel oil purposes. However, I prefer to increase the output of gasoline from the system by recycling part or all of these heavy products through line 35 back to heater 12 wherein the heavy products, herein designated "recycle gas oil," are heated to a high conversion temperature and contacted with powdered catalyst.

In order to avoid difficulty with the recycle gas oil heater coil becoming stopped up with carbon, I may discard all of the reflux condensate collected in the bottom of tower 29 and recycle only a gas oil fraction which is trapped out at a low point in the tower and recycled by line 36. I may also subject the recycle gas oil to selective extraction by a suitable solvent as indicated by the extraction stage 37 as shown in the drawing. Suitable valves in line 35 are indicated for bypassing part or all of the recycle stock through the extraction stage where the recycle stock is mixed with a selective solvent such as liquid sulfur dioxide for removing aromatic constituents and thereby reducing the amount of carbon deposition occurring on the catalyst in the subsequent conversion reaction. Oil having an increased content of paraffinic hydrocarbons refined by extraction in this way is conducted to the heater by line 38, while the extract fraction containing aromatic constituents is discarded by line 39.

After the recycle gas oil has been heated to the desired conversion temperature, for example, 950 to 1050° F., it is treated with catalyst in mixer 40 and thence flows with the dispersed catalyst by line 41 to a third reaction chamber 42. This reaction chamber may be provided with smaller contact space than either of the preceding chambers, in order to avoid over-exposure of aromatic type hydrocarbon vapors to the catalyst. The rate of sedimentation of catalyst from the recycle gas oil vapors in chamber 42 may also be separately regulated by regulating the vapor velocity therein as indicated hereinabove with respect to reaction chambers 21 and 22. The temperature of the vapors in reaction chamber 42 will, in general, be higher than the temperature in reaction chambers 21 and 22. For example, it may be about 1000° F. and generally within the range of 950 to 1050° F.

The pressure employed in reaction chambers 21, 22 and 42 is preferably atmospheric and generally not over 50 pounds per square inch. From reaction chamber 42 the converted vapors are passed by lines 43 and 25 to cyclone separator 26 in admixture with the converted hydrocarbon vapors from the other reaction chambers of the system.

The used catalyst which is separated in separator 26 and collected in tower 27 is maintained at a high level within that tower in order to provide the necessary hydrostatic pressure in the base of the tower for recycling the catalyst. The catalyst in 27 is maintained in a free-flowing condition by introducing a stream of aerating gas through line 44 near the bottom of the tower. It is desirable to use an inert gas, such as flue gas, etc., for this purpose. Combustible gases and vapors are swept from the used catalyst, and the gas may be conducted away by line 44a.

From the bottom of the used catalyst supply 27, the catalyst is permitted to flow by a mechanical regulating device indicated on the drawing by star valve 45, into the dispersing chamber 46 where air or other oxidizing gas is introduced by line 47, dispersing the catalyst and conveying it by line 48 to regenerator 49. As air is introduced into the used catalyst, oxidation of carbonaceous matter takes place at the temperature existing in the regenerator. Additional air may be introduced by line 50 into the regenerator and distributed to different points to control more uniformly the combustion occurring therein. Heat generated from combustion of carbonaceous matter is dissipated through the walls of the regenerator and from the extensive surface of regenerator coils 49. The temperature of the regenerator should be maintained below the point at which injury to the catalyst results. For certain synthetic silica catalysts and alumina-silica catalysts, temperatures of 1200 to 1900° F. may be allowable. With acid treated clays, however, and other catalysts such as magnesia-silica, a lower temperature is advisable. Temperatures below 1100 to 1200° F. are usually employed. The regenerator may alternatively comprise a vertical chamber with upwardly flowing catalyst and regeneration gases.

From regenerator 49 the catalyst and regeneration gases are conducted by line 51 to cyclone separator 52 where the catalyst is separated and permitted to fall by gravity back to catalyst tower 17. Aerating gas introduced into tower 17 by line 53 assists in keeping the catalyst in free-flowing form in the tower 17. Inert gas or air may be used for this purpose. It is withdrawn at the top of the tower by line 54 leading to cyclone separator 52. Gas is separated in separator 52 or vented from the system by line 55.

I have found that it is generally desirable to employ steam admixed with hydrocarbon vapors and catalyst in the reaction zones. For this purpose steam may be admixed by line 56 and directed into any or all of the lines 10, 11 or 35 as desired. The mechanism of the action of steam in the reaction is not clearly understood but it is believed to act on the catalyst in some manner to maintain higher catalyst efficiency, probably by reducing the rate or altering the character of carbon deposition on the catalyst surfaces.

Figure 2 illustrates a single reaction chamber which may be used in my process in place of reaction chambers 21, 22 and 42. When using the reaction chamber 57, shown in Figure 2, lines 19, 20 and 41 are arranged to enter the reaction chamber at different levels to permit varying the reaction volume and indirectly the contact time for each type of stock. Thus, the light gas oil vapors in line 19 enter reaction chamber 57 at the base and travel throughout the full length of the reaction chamber until they are discharged by line 25 leading to cyclone separator 26. The heavy gas oil in line 20 and the recycle gas oil in line 41 enter the reaction chamber at successively higher points. A series of inlets are connected by headers 58 and 59 to permit readily changing the points of introduction of the stocks. When using a single reaction chamber in this manner, instead of separate reaction chambers as shown in Figure 1, it is desirable to employ an elongated chamber with a relatively narrow cross sectional area to approach a streamline flow of the vapors through the reaction chambers and to avoid general mixing of the vapors which would result from counterflow. Longitudinal baffles, not shown, may also be employed to assist in maintaining the desired streamline flow and substantial segregation of unconverted vapors longitudinally.

The catalysts employed in my process are generally refractory, solid, siliceous materials with a fairly wide range of composition. Silica gel promoted by various metal oxides, such as magnesia, alumina, zirconia, etc. may be used. Such compositions may consist of 90 to 98% of silica gel and the remainder promoting oxides. Other synthetic catalysts prepared by co-precipitating silica and alumina are effective. Artificial zeolites of various types may also be employed. Natural minerals may be used, including especially the clays, fuller's earth, bentonite, bauxite, etc., preferably activated by acid treatment. The catalyst may be prepared in a fine state of subdivision by precipitation, for example, by adding ammonia to salt solutions to precipitate the hydrated oxide or by adding acid to alkali salts such as sodium silicate, sodium aluminate, etc. Massive substances may be finely ground to the desired state of subdivision, for example, 100 mesh and finer. In general, the powdered catalyst which I employ will largely pass a 200 mesh screen and contain a very considerable portion passing 300 mesh and even 400 mesh.

The ratio of catalyst to oil may vary depending on the activity of the catalyst, the stock treated, the conditions employed, etc. Ordinarily, about 2 to 3 parts of catalyst per part of oil by weight is desirable. Under some conditions I may use more or less catalyst, for example, from ½ to 10 or 15 parts of catalyst per part of oil by weight. In general, the synthetic catalysts are more active than the natural catalysts and lower catalyst to oil ratios may be employed with them. As an example of the ratio of catalyst to oil used for the different stocks, I may employ 1 to 4 pounds of catalyst per pound of oil for the light gas oil fraction, about ½ to 3 pounds of catalyst per pound of oil for the heavy gas oil fraction and about 5 to 15 pounds of catalyst per pound of recycle oil.

In catalytic cracking with the catalyst in a fixed bed it has been convenient to use the "space velocity" as a measure of the severity of treatment from the catalyst standpoint. In general, the same catalyst will produce the same amount of gasoline from a charging stock under the same conditions of temperature and pressure if the space velocity is the same. The space velocity is commonly expressed as the volume of liquid oil charged per hour per unit volume of catalyst and for convenience the catalyst volume is usually taken as the apparent volume of the catalyst when in compact form.

In the case of stationary bed catalysts, the space velocity is relatively easy to determine but in suspended catalyst operation with powdered catalysts, difficulties arise from the fact that the catalyst is not in compact form while in use and its volume is, therefore, not directly determinable. In powdered catalyst operation, it is, therefore, more convenient to express space velocity on a weight basis as the pounds of oil per hour per pound of catalyst in the reaction zone at any given instant and the term "mass velocity" used herein shall be understood to have that meaning. This is readily determined from the rate of oil charged, the volume of the reaction chamber and the density of the catalyst in the reaction chamber. The density may be determined by the differential pressure between the top and the bottom of the reaction chamber, by withdrawing and inspecting a sample from the reaction chamber or by other means. The ratio of fresh catalyst to oil charged to the reaction chamber is important only as it affects the "catalyst residence time," i. e., the average time for particles of catalyst to traverse the reaction chamber. This value may be readily calculated from the rates of charging catalyst and oil and the amount of catalyst in the reaction chamber.

In general, I employ a mass velocity in the range of about 1 to 20 parts of oil per hour per part of catalyst by weight depending on the stock treated. A higher mass velocity may be desirable for the recycle gas oil converted in reaction chamber 42, for example, about 10 to 50. For the conversion of heavy gas oil in reaction chamber 22, I may suitably employ a mass velocity of about 5 to 30 but for the conversion of light gas oil in chamber 21, I usually employ a mass velocity of about 1 to 20. The choice of mass velocity employed within these ranges will depend on catalyst activity, the character of the oil treated, temperature of the reaction zone and some other factors. In a typical example, zone 21 operates at 4 mass velocity, zone 22 at 8 mass velocity and zone 42 at 14 mass velocity. In general, the severity of cracking conditions for each stock in my process is controlled to effect optimum utilization of the catalyst rather than maximum conversion of hydrocarbons.

I have described my invention by means of a specific method of its application. However, I do not intend that it be limited by method disclosed. For example, I have disclosed the use of reaction chambers of a specific type but I may also employ pipe coils for carrying out the reaction, the mixture of vapors and powdered catalyst being forced through coils of different lengths and volumes. Thus, I may use a long coil in place of reactor 21 and shorter coils for reactors 22 and 42, the desired reaction conditions being determined by the temperature at which the coils are maintained and by the volume of the coil.

Having thus described my invention, what I claim is:

1. The process of converting heavy hydrocarbon oils into gasoline of high knock rating which comprises separately heating and vaporizing a plurality of streams of oil of different carbonization characteristics, dispersing powdered catalyst in the resulting vapor streams, separately conducting said vapor streams and catalyst to separate reaction zones, withdrawing vapors and dispersed catalyst from said reaction zones, combining the vapor-catalyst mixtures from said reaction zones, separating the combined catalyst from said vapors in a single separating zone, fractionating the separated vapors in a single fractionating zone and recovering a desired gasoline fraction therefrom, discharging separated combined catalyst to a single catalyst regenerating zone wherein carbonaceous deposits are removed by contacting with oxygen-containing gases, recycling and dispersing regenerated combined catalyst in the vapor streams first mentioned and maintaining within said reaction zones different mass velocities to produce about the same amount of carbonaceous deposit on the catalyst in each of said reaction zones.

2. The process of claim 1 wherein one of the oils charged to the system comprises heavier hydrocarbons separated from gasoline in said fractionating zone.

3. The process of claim 1 wherein two of the oils charged to the system comprise a light gas oil fraction and a heavy gas oil fraction obtained from the distillation of crude petroleum and said light gas oil is contacted with said catalyst at a lower mass velocity than said heavy gas oil.

4. The process of claim 1 wherein a light gas oil and a heavy gas oil are charged to said reaction zones and the ratio of catalyst to oil suspended in the heavy gas oil reaction zone is substantially less than that in the light gas oil reaction zone.

5. The process of converting hydrocarbon oils into gasoline of high knock rating which comprises separating the oil into light and heavy fractions, heating said fractions in continuous streams to a high conversion temperature, continuously dispersing a powdered, solid catalyst in said vapor streams, separately conducting said vapor streams and dispersed catalyst to separate reaction zones, subjecting each of said vapor streams to catalytic conversion in said reaction zones at different mass velocities selected to produce about the same amount of carbonaceous deposit on the catalyst in each of said reaction zones, combining the said vapors and dispersed catalyst from said reaction zones in a single catalyst separating zone, separating the combined catalyst from said vapors and regenerating it by combustion with oxygen-containing gases to remove carbonaceous deposits therefrom, redistributing combined regenerated catalyst between said light and heavy fractions, fractionating converted hydrocarbon vapors in a fractionating zone and therein separating the desired gasoline fraction from the heavier products of the conversion reaction.

6. The process of claim 5 wherein the products heavier than gasoline separated by said fractionating zone are subjected to extraction by a selective solvent, thereby increasing the concentration of paraffinic hydrocarbons in said heavier products and the treated heavier products are recycled to one of said separate catalytic reaction zones.

7. In the process of converting a heavy hydrocarbon oil into gasoline wherein said oil is continuously contacted with a powdered solid cracking catalyst at conversion temperatures in the range of 850° to 1050° F., the improvement comprising separating said heavy oil into a light and a heavy fraction, contacting said light fraction with suspended powdered catalyst in a first reaction zone, contacting said heavy oil with said powdered catalyst in a second reaction zone, combining hydrocarbon vapors and catalyst from both reaction zones and separating the combined catalyst from said vapors in a catalyst separating zone, fractionating the separated vapors to produce a desired gasoline fraction and a heavy recycle oil fraction, vaporizing said recycle oil fraction and dispersing powdered catalyst in the resulting vapors, effecting conversion of said recycle oil vapors in a third reaction zone by the action of said catalyst, combining the converted recycle oil vapors and suspended catalyst with the hot vapors and suspended catalyst from said first and second reaction zones prior to said catalyst separating zone, removing the combined catalyst from said catalyst separating zone, regenerating it by controlled combustion with an oxygen-containing gas, distributing the regenerated combined catalyst among said reaction zones and regulating the conditions of temperature, mass velocity and catalyst-to-oil ratio in said reaction zones to effect a substantially uniform deposit of carbon on said catalyst.

8. The process of claim 7 wherein said heavy recycle oil is extracted before recycling with a selective solvent to remove therefrom aromatic constituents.

9. The process of claim 7 wherein said light gas oil fraction is contacted in said first reaction zone at a mass velocity of about 1 to 20 pounds of oil per hour per pound of catalyst, said heavy gas oil is contacted in said second reaction zone at a mass velocity of about 5 to 30 pounds of oil per hour per pound of catalyst and said heavy recycle oil fraction is contacted with catalyst in said third reaction zone at a mass velocity of about 10 to 50 pounds of oil per hour per pound of catalyst.

10. The process of converting heavy hydrocarbon oils into gasoline of high knock rating which comprises separately heating a plurality of streams of oil of different carbonization characteristics, separately conducting said heated streams to separate upflow reaction zones wherein vaporous reaction products are produced, dispersing powdered catalyst in said upflow reaction zones, withdrawing vapors and dispersed catalyst from said reaction zones, combining the vapor-catalyst mixtures from said reaction zones, separating the combined catalyst from said vapors in a single separating zone, fractionating the separated vapors in a single fractionating zone and recovering the desired gasoline fraction therefrom, discharging separated combined catalysts to a single catalyst regenerating zone, wherein carbonaceous deposits are removed by contacting with oxygen-containing gases, recycling and dispersing regenerated combined catalyst in said upflow reaction zones, and maintaining within said reaction zones different mass velocities to produce about the same amount of carbonaceous deposit on the catalyst in each of said reaction zones.

ARTHUR L. CONN.